United States Patent
Miyajima

Patent Number: 5,850,414
Date of Patent: Dec. 15, 1998

[54] SPREAD SPECTRUM COMMUNICATION RECEIVER WITH SYNCHRONIZING CIRCUIT

[75] Inventor: Hiromitsu Miyajima, Ageo, Japan

[73] Assignee: Mitsui Mining & Smelting Co., Ltd., Tokyo, Japan

[21] Appl. No.: 527,283

[22] Filed: Sep. 12, 1995

[30] Foreign Application Priority Data

Nov. 28, 1994 [JP] Japan ................................ 6-316112

[51] Int. Cl.⁶ ................................................. H04B 1/707
[52] U.S. Cl. ..................................... 375/206; 375/208
[58] Field of Search ................................ 375/200, 206, 375/208, 209, 210

[56] References Cited

U.S. PATENT DOCUMENTS

| | | | |
|---|---|---|---|
| 5,038,362 | 8/1991 | Takeuchi et al. | 375/200 |
| 5,038,363 | 8/1991 | Mitsutsuka | 375/200 |
| 5,208,830 | 5/1993 | Cornec et al. | 375/200 |
| 5,278,864 | 1/1994 | Mori et al. | 375/208 |
| 5,668,829 | 9/1997 | Saito | 375/208 |

Primary Examiner—Stephen Chin
Assistant Examiner—Jeffrey W. Gluck
Attorney, Agent, or Firm—Bucknam and Archer

[57] ABSTRACT

A spread spectrum communication receiver includes an inverse spread demodulation circuit and a primary demodulation circuit. The inverse spread demodulation circuit has an image PN code generation circuit for generating an image PN code having an image relationship with a PN code which was used in spread modulation of a spread spectrum signal to be received and demodulated, an SS reference signal generation circuit for generating a spread spectrum reference signal having an image relationship with the spread spectrum signal to be demodulated using the image PN code, and a surface acoustic wave device for taking a correlation between the received spread spectrum signal and the spread spectrum reference signal. The primary demodulation circuit has a detection circuit for generating a convolution output by detecting the correlation output from said inverse spread demodulation circuit, and a waveform shaping circuit for shaping the convolution output. The receiver further includes a synchronization circuit for synchronizing a repetition period of the image PN code with the convolution output.

2 Claims, 10 Drawing Sheets

SPREAD SPECTRUM COMMUNICATION RECEIVER WITH SYNCHRONIZING CIRCUIT

FIELD OF THE INVENTION

The present invention relates to a spread spectrum communication receiver for receiving a signal which was spread-spectrum-modulated and transmitted, and inverse-spread-demodulating the received signal.

BACKGROUND OF THE INVENTION

A so-called spread spectrum communication (SSC) scheme is one for performing a communication by diffusing the frequency spectrum of a transmission signal using a spread code (i.e., pseudo noise code). This method can minimize the transmission power density per unit frequency bandwidth, and is excellent in privacy, confidentiality and resistance to interference.

In the spread spectrum communication, a transmitter (SSC transmitter) primarily modulates digital data (transmission data) to be transmitted, then, spreads (i.e., spread-modulates) the primarily modulated digital data to a wide frequency band using a PN (pseudo noise) code, and transmits the double modulated digital data. The spread modulation is also called a secondary modulation. As a modulation method of the primary modulation, FSK (frequency shift keying) modulation, DPSK (differential phase shift keying) modulation, or the like is used.

A receiver (SSC receiver) generates a PN code (image PN code) which has an image relationship with that of the transmitter, then, generates a spread signal (to be referred to as "an SS reference signal" hereinafter) having an image relationship with the spread spectrum signal of the transmitter using the image PN code, and correlates the receiver input with the SS reference signal to form a correlation peak train. This processing is called secondary demodulation or inverse spread demodulation. As a correlator for taking the above correlation, for example, a SAW (surface acoustic wave) device such as a SAW convolver or a matched filter can be used. The correlation peak train is detected and shaped to demodulate the transmission data. This processing is called primary demodulation. As a detection method for the primary demodulation, for example, an envelope detection method, a delay detection method or a synchronous detection method can be adopted.

Figure 11:
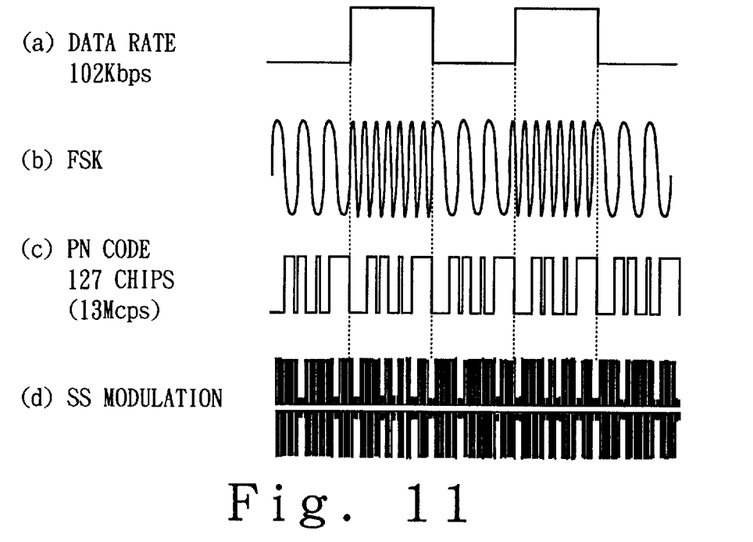
Figure 12:
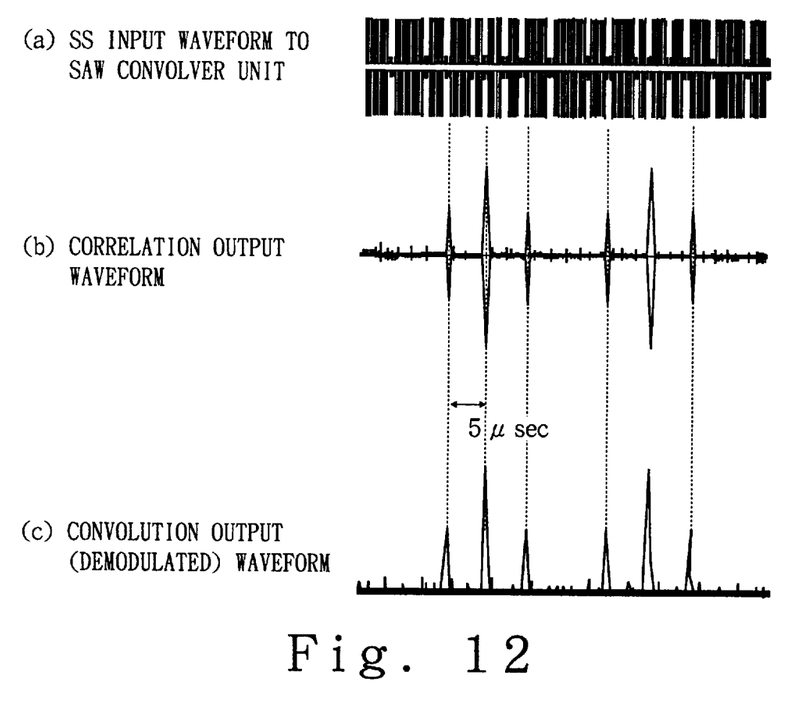

FIGS. 11(a) to 12(c) respectively show the waveforms of the respective units in the SSC transmitter and the SSC receiver. FIG. 11(a) shows the transmission data waveform at a data rate of 102 Kbps, FIG. 11(b) shows the primary modulated waveform after the FSK modulation which respectively sets high (H-) and low (L-) level carrier waves for the transmission data (FIG. 11(a)) to be 200 MHz and 199.9 MHz, FIG. 11(c) shows a PN code with a 127-chip length at 13 Mcps (chips per second), and FIG. 11(d) shows a waveform obtained by spread-modulating (SS-modulating) the primary modulated waveform (FIG. 11(b)) by the PN code (FIG. 11(c)). The data (FIG. 11(a)) and the PN code (FIG. 11(c)) are synchronized, and the pulse width of one bit of the transmission data corresponds to one period (T=127/13 ≈10 $\mu$S) of the PN code. More specifically, the communication rate of this transmission data is 13,000 Kcps/127=102 Kbps. FIG. 12(a) shows the input waveform to the SAW convolver unit, FIG. 12(b) shows the correlation output waveform from the correlator, and FIG. 12(c) shows the demodulated (convolution output) waveform. In the convolution output, normally, three pulses are generated at T/2 intervals per period T of the PN code, as shown in FIG. 12(c).

Figure 13:
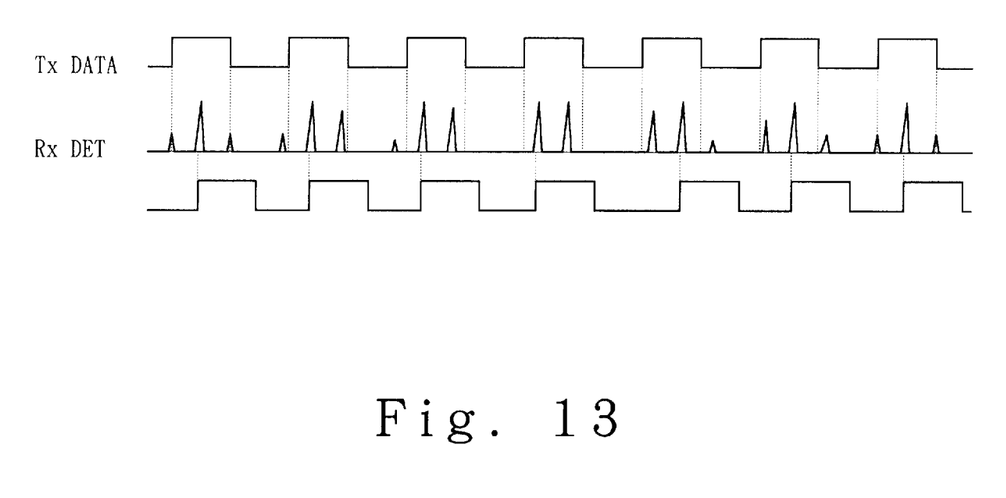

In the conventional SS(, receiver described above, as shown in FIG. 13, the pulse level and the pulse generation timing of the convolution output waveform gradually change. As a result, bits which were transmitted may be omitted, or bits which were not transmitted may be detected, thus causing bit errors. In particular, when the pulse width of one bit of the transmission data corresponds to one period of the PN code, as shown in FIGS. 11(a) to 12(c), to increase the communication rate, such bit errors have serious influence.

The convolution output waveform suffers the above-mentioned changes in output pulse level and generation timing over time, and also changes depending on the strength of the received signal. For example, in three convolution outputs per period of the PN code, only the central pulse is high and the two side pulses are low in level (height), as shown in FIG. 12(c), if the generation timing is left unchanged. However, if the received signal is strong to some extent, all these three pulses have substantially the same levels (heights). Since waveform shaping is attained by detecting pulses exceeding a predetermined level, if the number of detected pulses is different, the conventional SSC receiver has a different shaped output waveform even if the transmission data remains the same. As a result, the transmission data cannot be correctly demodulated.

SUMMARY OF THE INVENTION

The present invention has been made in consideration of the above-mentioned problems, and has as its object to provide an SSC receiver which can eliminate reception errors.

In order to achieve the above object, according to a first aspect of the present invention, there is provided a spread spectrum communication receiver comprising (1) an inverse spread demodulation circuit having (1-1) an image PN code generation circuit for generating an image PN code having an image relationship with a PN code which was used in spread modulation of a spread spectrum signal to be received and demodulated, (1-2) an SS reference signal generation circuit for generating a spread spectrum reference signal having an image relationship with the spread spectrum signal to be demodulated using the image PN code, and (1-3) a surface acoustic wave device for taking a correlation between a received spread spectrum signal and the spread spectrum reference signal, (2) a primary demodulation circuit having (2-1) a detection circuit for generating a convolution output by detecting the correlation output from the inverse spread demodulation circuit, and (2-2) a waveform shaping circuit for shaping the convolution output, and (3) a synchronization circuit for synchronizing a repetition period of the image PN code with the convolution output.

According to a second aspect of the present invention, there is provided a spread spectrum communication receiver, which comprises (1) an inverse spread demodulation circuit having (1-1) an SS reference signal generation circuit for generating a spread spectrum reference signal having an image relationship with a spread spectrum signal to be received and demodulated, and (1-2) a surface acoustic wave device for taking a correlation between the received spread spectrum signal and the spread spectrum reference signal, and (2) a primary demodulation circuit having (2-1) a detection circuit for generating a convolution output by detecting the correlation output from the inverse spread demodulation circuit, and (2-2) a waveform shaping circuit for reproducing digital data of a transmission source by shaping the convolution output, characterized in that a pulse width of one bit of the digital data of the transmission source is substantially NT (where T is the repetition period of a PN code of the transmission source and N is an integer not less than 1), and the waveform shaping circuit comprises (2-2-1) a convolution output detection circuit for converting a convolution output into a pulse having a width T/2 every time the detection circuit outputs a convolution output exceeding a predetermined level, (2-2-2) a shift register for fetching or accepting an output from the convolution output detection circuit and shifting the fetched output at a predetermined timing every T/2, (2-2-3) a selection circuit for selecting one or a plurality of stages of the shift register and generating a disjunction (OR) output of outputs from the selected stages, and (2-2-4) a latch circuit for latching the output from the selection circuit at the period NT and at a timing delayed by a time τ satisfying 0<τ<T/2 from the shift timing. In the preferred embodiment of the present invention, the shift register has 2N stages, the convolution output detection circuit changes a threshold value used for detecting the convolution output in correspondence with a level of the convolution output, and the selection circuit selects a predetermined stage and outputs the output from the selected stage when the threshold value is larger than a predetermined value, and selects all the stages of the shift register and outputs an OR of the stages when the threshold value is smaller than the predetermined value.

It is estimated that a change of the convolution output waveform is attributed to the fact that the code rate of the PN code at the transmitter side is slightly different from that of the image PN code at the receiver side, and the phase relationship between these PN codes gradually changes. In the first aspect of the present invention, the repetition period of the image PN code generated in the SSC receiver is synchronized with the generation timing of the convolution output. Thus, the image PN code at the receiver side can be synchronized with the PN code at the transmitter side, and the time variations in pulse generation timing and pulse level of the convolution output waveform can be prevented.

In the second aspect of the present invention, the central one of the three pulses of the convolution output is discriminated from at least one of the pulses before or after the central pulse, and the discriminated pulse is shaped to a width T/2. The shaped pulse is delayed by T/2 by the respective stages of the shift register, and signals from proper stages of the shift register are synthesized. Furthermore, the synthesized signal is latched in units of bits of the transmission data at a timing slightly deviating from the shift timing. With this processing, a demodulated signal corresponding to the respective bits of the transmission data can be obtained. When the level of the received signal is not so high, since the central one of the three pulses of the convolution output can be discriminated by its level from at least one of the pulses before or after the central pulse, when the delay amount by the shift register is set to be NT/2, an L-level (low level) portion of at least T/2 is formed in an L-level bit. Therefore, when this portion is latched at the abovementioned timing, the L-level bit is latched, and an L-level bit can be prevented from being erroneously detected as an H-level (high level) bit.

BRIEF DESCRIPTION OF THE DRAWINGS

FIGS. 11(a) to 13 are waveform charts showing the signals of the respective units in a conventional SSC receiver.

DESCRIPTION OF THE PREFERRED EMBODIMENTS

The preferred embodiments of the present invention will be described hereinafter with reference to the accompanying drawings.

Figure 1:
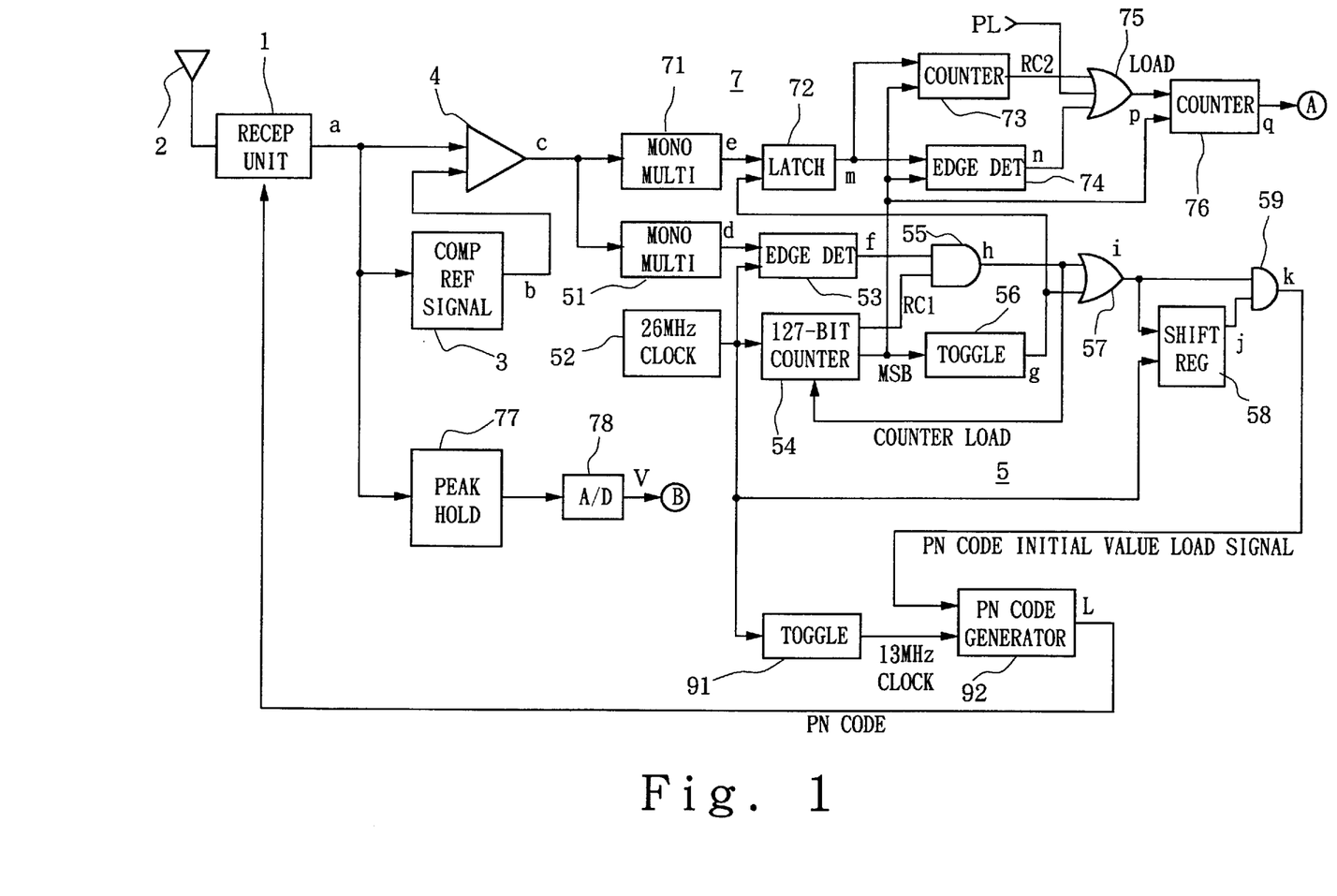
FIGS. 1 and 2 are block diagrams of an SSC receiver according to an embodiment of the present. invention.
Figure 2:
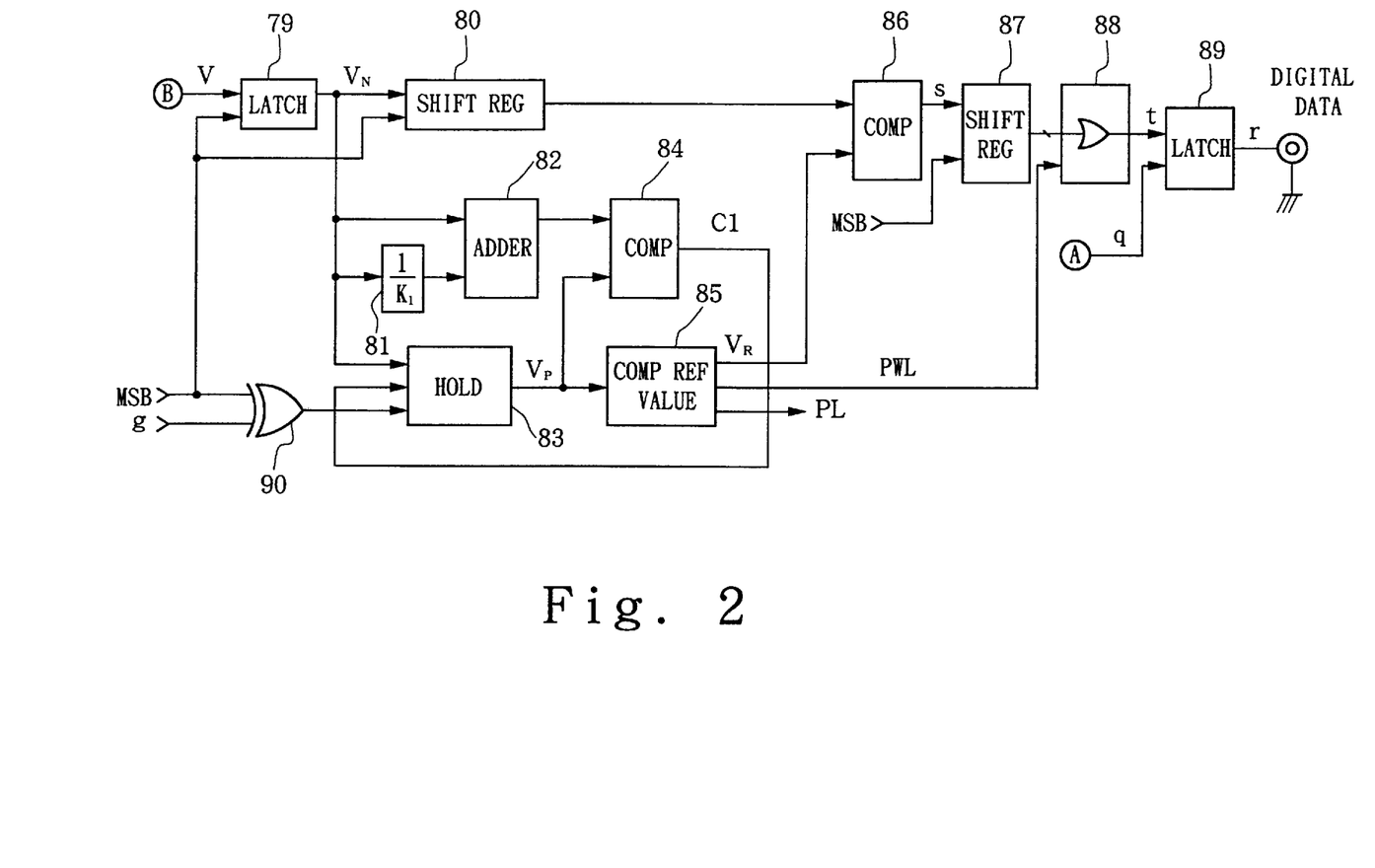
Figure 3:
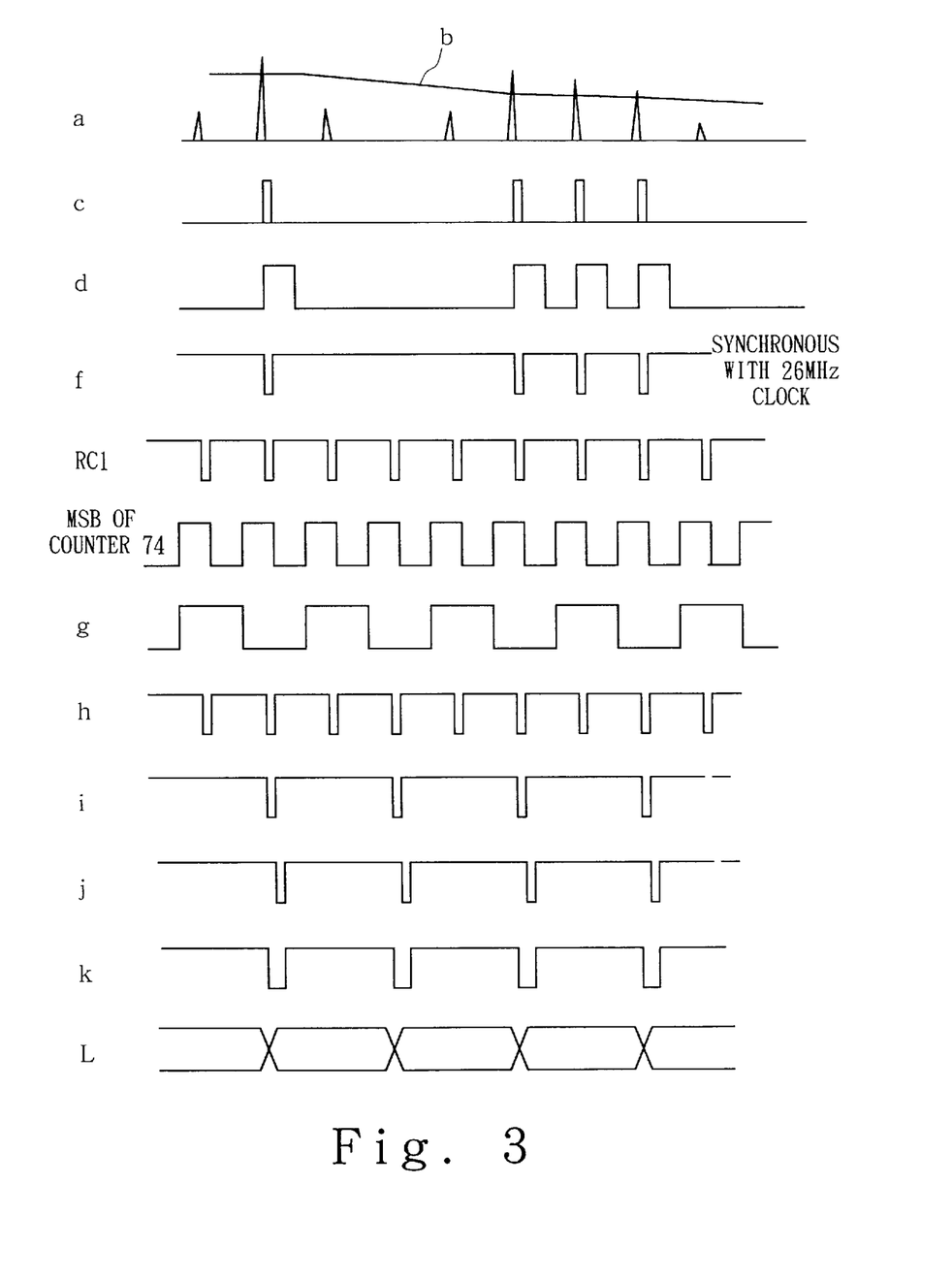
FIGS. 3 to 6 are waveform charts showing the signals of the respective units in the receiver shown in FIGS. 1 and 2.
Figure 4:
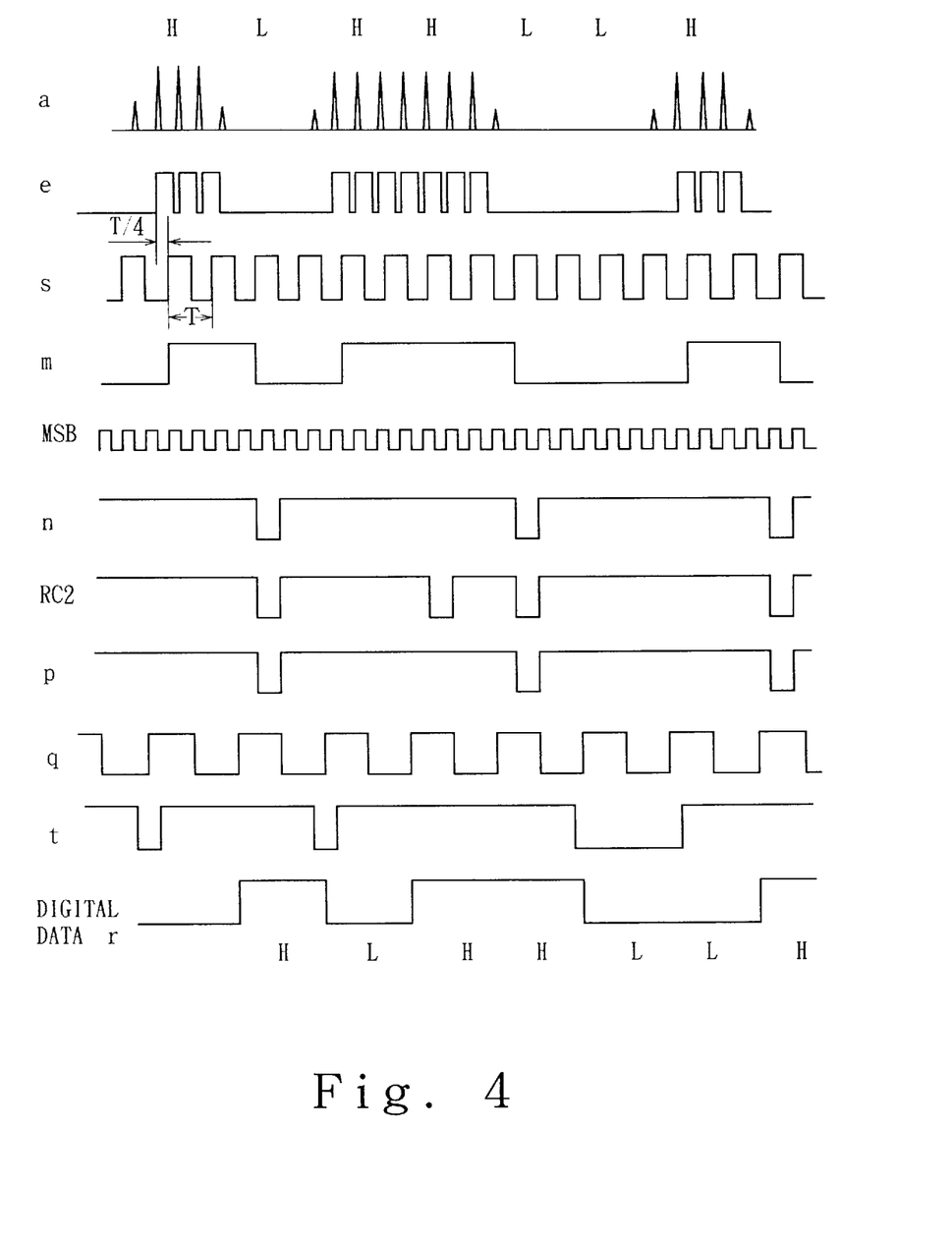

FIGS. 1 and 2 are block diagrams of an SSC receiver according to an embodiment of the present invention. FIGS. 3 and 4 show the waveforms of the respective units in the SSC receiver shown in FIGS. 1 and 2. Reference symbols assigned to the waveforms shown in FIGS. 3 and 4 correspond to those shown in FIGS. 1 and 2.

Referring to FIG. 1, a reception unit 1 is similar to that of the conventional SSC receiver which receives a signal shown in FIGS. 11(d) and 12(a). That is, the reception unit 1 receives a spread spectrum (SS) signal in a 2.4-GHz band transmitted from a transmitter (not shown) via an antenna 2, frequency-converts the received signal into a signal in a 200-MHz band, takes a correlation between the frequency-converted received signal (FIG. 12(a)) and an SS reference signal having an image relationship with this received signal, and performs delayed detection of this correlation output (FIG. 12(b)), thus outputting a demodulated waveform (convolution output) shown in FIG. 12(c) or indicated by a waveform a in FIG. 3. The convolution output a is supplied to a comparator reference signal generation circuit 3, a comparator 4, and a peak hold circuit 77 constituting a waveform shaping circuit 7 as the characteristic feature of the present invention.

The comparator reference signal generation circuit 3 performs envelope detection and voltage division of the convolution output a to generate a reference signal b. The comparator 4 generates a positive output c during a period in which the convolution output a exceeds the reference signal b. The output c from the comparator 4 is inputted to a monostable multivibrator 51 constituting a synchronization circuit 5 as the characteristic feature of the present invention, and a monostable multivibrator 71 constituting the waveform shaping circuit 7 to be shaped into pulses d and e with a sufficient pulse width within $T/2=127/26 \approx 5$ μS.

In the synchronization circuit 5, a clock generation circuit 52 generates clocks of 26 MHz as a frequency twice the frequency, 13 Mcps, of the PN code at the transmitter side. The 26-MHz clocks are supplied to an edge detection circuit 53, a 127-bit counter 54, a shift register 58, and a toggle circuit 91.

The 26-MHz clocks are frequency-divided to ½ by the toggle circuit 91, and are supplied to a PN code generation circuit 92 for generating an image PN code having an image relationship with the PN code at the transmitter side as clocks of 13 MHz, which is nominally equal to the frequency of the clocks for generating the PN code at the transmitter side. Note that a SS reference signal generation circuit (not shown) are arranged in the reception unit 1.

In the synchronization circuit 5, the edge detection circuit 53 outputs an L-level (low level) pulse (negative pulse) f having a width equal to one period of the 26-MHz clocks in response to the leading edge of the output d from the monostable multivibrator 51, and supplies this pulse to one input terminal of an AND gate 55. The counter 54 counts the 26-MHz clocks, and outputs a carrier signal RC1 consisting of negative pulses having a width equal to one period of the 26-MHz clock every time it counts 127 clocks, i.e., every T/2. Also, after the counter 54 counts 64 clocks, its most significant bit (MSB) is set at H-level (high level) until the counter is initialized. The carrier signal RC1 from the counter 54 is supplied to the other input terminal of the AND gate 55. The MSB signal from the counter 54 is supplied to a toggle circuit 56, and is also supplied to counters 73 and 76, edge detection circuit 74 a latch circuit 79, and shift registers 80 and 87, which constitute the waveform shaping circuit 7, as clocks having a period T/2, i.e., a frequency F=26,000/127 ≈205 kHz.

In this case, the AND gate 55 is used as a negative logic OR gate, and outputs a negative pulse output h each time it receives at least one of the negative pulse f and the signal RCI. The negative pulse output h is supplied to the counter 54 as an initialization (counter load) signal. Therefore, even when the frequency of the 26-MHz clocks is lower than a value twice the clock frequency of the PN code at the transmitter side and the counter 54 has not counted 127 26-MHz clocks yet, the counter 54 is initialized upon detection of the convolution output a. The negative pulse output h from the AND gate 55 is also inputted to one input terminal of an OR gate 57. The toggle circuit 56 frequency-divides the MSB signal from the counter 54 to ½ to generate a signal g having a period T=127/13 =10 μS (frequency of about 102 kHz) twice that of the MSB signal. The signal g is inputted to the other input terminal of the OR gate 57, and a latch circuit 72 constituting the waveform shaping circuit 7.

In this case, the OR gate 57 is used as a negative logic AND gate, and outputs as an output; the negative pulse output h from the AND gate 55 only when the output from the toggle circuit 56 is at L-level. Thus, of the carrier output RC1 from the counter 54 and the convolution output which are outputted at the periods T/2, an output at a period T is outputted as the output i from the OR gate 57. The output i is converted into a negative pulse signal k having a pulse width larger by the period of the 26-MHz clocks by the shift register 58 for delaying the output i by one period of the 26-MHz clocks and an AND gate 59 for calculating a negative logic OR of a delayed output i from the shift register 58 and the output i. The signal k is then supplied to the PN code generation circuit 92 as an initialization (PN code initial value load) signal.

As described above, when the clock period of the PN code generation circuit 92 is longer than that of the PN code at the transmitter side, the convolution output a is detected before the PN code generation circuit 92 generates a PN code with a 127-chip length since the generation phase of the convolution output a gradually advances. As a result, the PN code generation circuit 92 is initialized without generating a PN code with a 127-chip length; for example, it is initialized when it generates a PN code of 126 chips. On the other hand, when the clock period of the PN code generation circuit 92 is shorter, the convolution output a is detected after the carrier signal RC1 is generated by the counter 54. Thus, the period of the initialization signal is prolonged, and the initialization of the PN code generation circuit 92 is delayed. Meanwhile, when the convolution output a is detected after the PN code generation circuit 92 is initialized by the carrier signal RC1 from the counter 54, the PN code generation circuit 92 is re-initialized immediately after initialization. In this manner, the repetition period of the image PN code output L from the PN code generation circuit 92 is synchronized with the convolution output a from the reception unit 1.

In the above description, one bit of the transmission data corresponds to one repetition period of the PN code at the transmitter side. The abovementioned arrangement can be commonly used in a case wherein one bit of the transmission data corresponds to a plurality of repetition periods of the PN code at the transmitter side.

Figure 5:
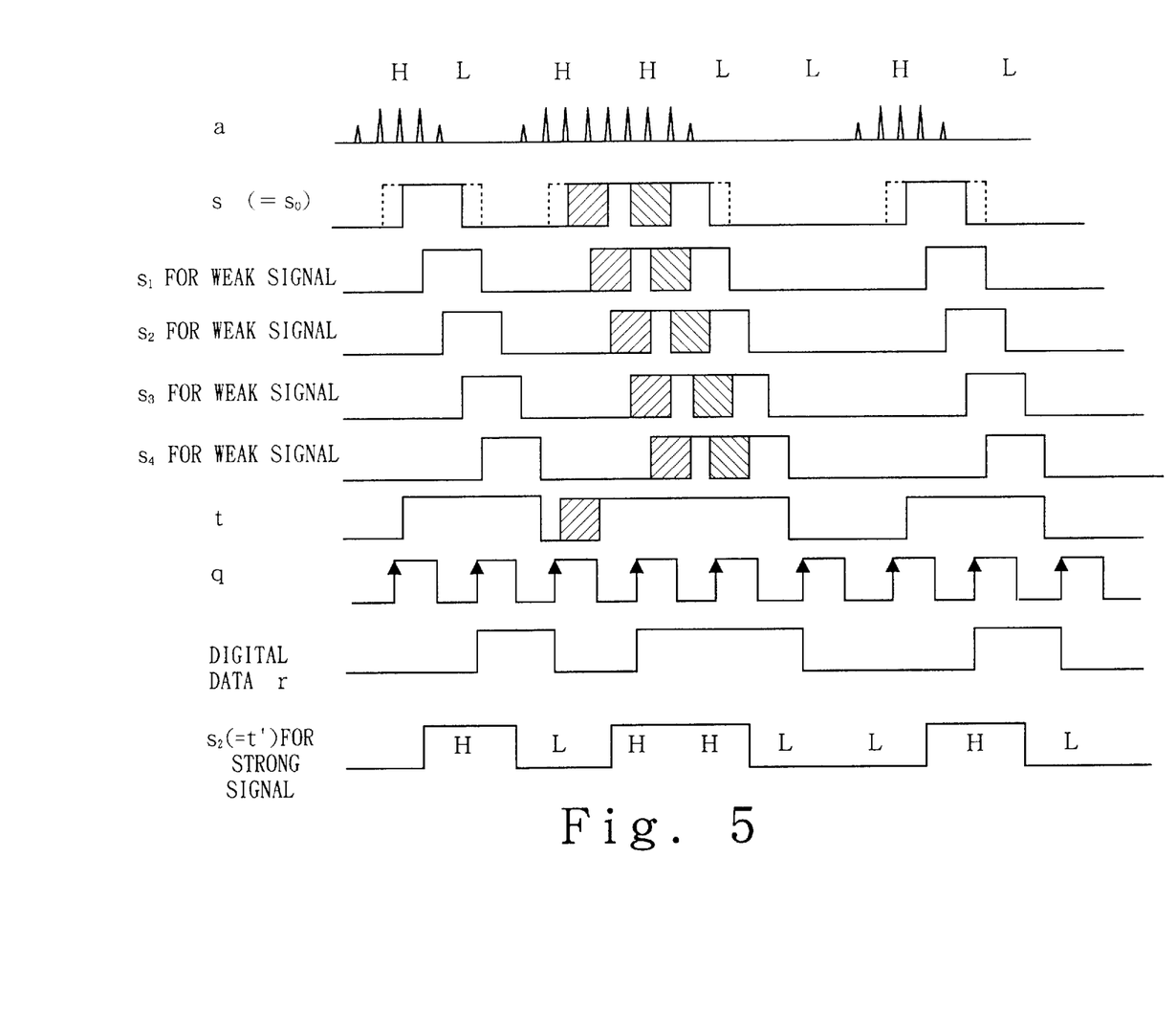
Figure 6:
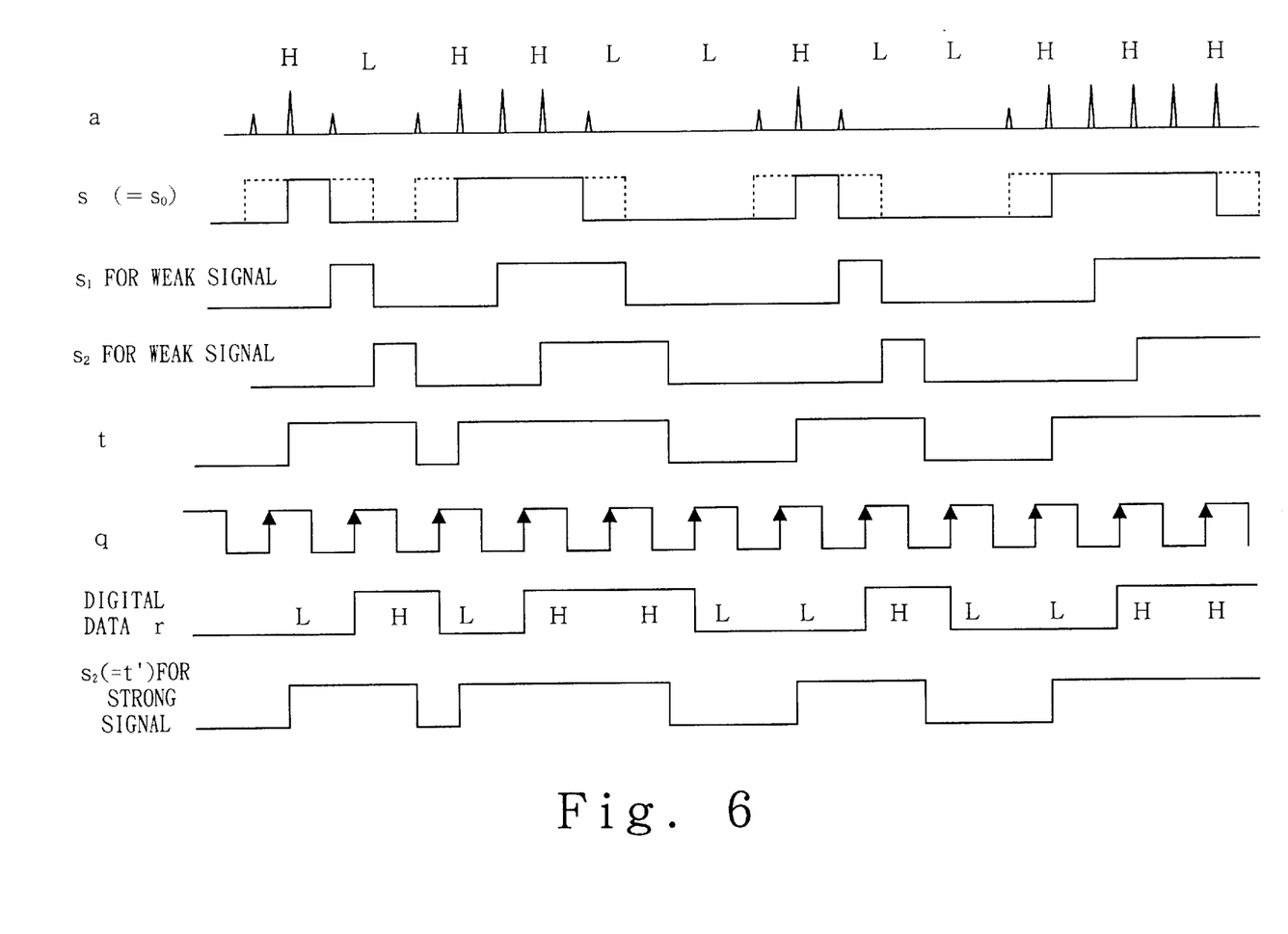

FIGS. 4 and 5 mainly show the waveforms of the respective units in the waveform shaping circuit 7 obtained when one bit of the transmission data corresponds to two repetition periods of the PN code at the transmitter side (data rate: 51 Kbps). FIG. 6 shows the waveforms of the respective units as in FIG. 5 obtained when one bit of the transmission data corresponds to one repetition period of the PN code at the transmitter side (data rate: 102 Kbps). In FIGS. 5 and 6, a solid line represents the waveform upon reception of a weak signal, and a broken line represents the waveform upon reception of a strong signal.

The arrangement and operation of the waveform shaping circuit 7 of the receiver shown in FIGS. 1 and 2 will be described below with reference to FIGS. 4 to 6. In the following description, a case will be exemplified wherein one bit of the transmission data corresponds to N repetition periods (N is an integer equal to or larger than 1) of the PN code at the transmitter side.

The latch circuit 72 latches the output e from the monostable multivibrator 71 in response to the leading edges of the clocks g of 102 kHz output from the toggle circuit 56 in the synchronization circuit 5. More specifically, the output m from the latch circuit 72 is updated every period T. The leading edges of the clocks g normally deviate from the peak position of the convolution output a by about T/4. The counter 73 is a counter for counting clock MSBs of about 204 kHz, which are the MSB signals from the counter 54 in the synchronization circuit 5 while the output m from the latch circuit 72 is H-level, and generates a carrier output RC2 as a negative pulse signal having a width T/2 every time it counts 2N clock MSBs. The carrier output RC2 is inputted to the first input terminal of an OR gate 75. The edge detection circuit (counter) 74 detects the trailing edge of the output m from the latch circuit 72, and outputs a negative pulse signal n having a width for one period of the clocks MSB. The circuit 74 supplies the signal n to the second input terminal of the OR gate 75.

The OR gate 75 is used as a negative logic AND gate in this case, and sets its output p at L-level when both the counter 73 and the edge detection circuit 74 generate negative pulse signals, and a reference value $V_R$ (to be described later) is equal to or larger than a predetermined level. The L-level output p is supplied to the counter 76 as an initialization (load) signal. The counter 76 is a counter which is set (loaded) with an initial value of 2N-1, and then repetitively counts clocks MSB up to 2N clocks. The counter 76 supplies clocks q having a period NT as its output to a latch circuit 89. Since the clocks q are synchronized with the convolution output a and are also synchronized with the clocks g, the leading edges of the clocks q normally deviate from the peak position of the convolution output a by about T/4 as in the clocks g.

The peak hold circuit 77 holds an instantaneous voltage every predetermined period defined by the conversion processing time (sampling time $T_{sp}$<<N/2) of an A/D converter 78, and the A/D converter 78 converts the hold voltage into digital data V. The latch circuit 79 latches the output data V from the A/D converter 78 in response to the leading edges of the clocks MSB. The latch data $V_N$ is supplied to the shift register 80, an operator 81, an adder 82, and a hold circuit 83.

The shift register 80 delays the Latch data $V_N$ from the latch circuit 79 by one period T/2 of the clocks MSB, and supplies the delayed data to one terminal of a comparator 86. This is to prevent the latch data $V_N$ from being inputted to the comparator 86 during an interval in which the comparison reference value $V_R$ is calculated by components from the operator 81 to a comparison reference value setting circuit 85.

The operator 81 divides the latch data $V_N$ from the latch circuit 79 by $K_1$, and inputs the quotient output $V_N/K_1$ to one terminal of the adder 82. The adder 82 adds the latch data $V_N$ from the latch circuit 79 and the quotient output $V_N/K_1$ from the operator 81, and supplies the sum output $V_N(K_1+1)K_1$ to one input terminal of a comparator 84. The comparator 84 compares the sum output $V_N(K_1+1)/K_1$ with hold data $V_P$ (initial value is 0) of the hold circuit 83, and generates an output C1 when the sum output $V_N(K_1+1)/K_1$ is larger than $V_P$.

The hold circuit 83 holds the latch data $V_N$ from the latch circuit 79 when the comparator 84 generates an output C1 and one of the clocks MSB and g changes to H-level. More specifically, the hold data $V_P$ of the hold circuit 83 is updated to new latch data $V_N$ when $K_1/(K_1+1)$ of new data $V_N$ latched by the latch circuit 79 is larger than the hold data $V_P$. An exclusive OR (EX-OR) gate 90 is arranged for the purpose of holding only the central one of the three pulses per period T of the convolution output a. $K_1$ is set to be, e.g., $K_1=2$. Note that $K_1$ can be selected from ½, 1, and 2 in this embodiment. The comparison reference value setting circuit 85 outputs a value obtained by multiplying the hold data output $V_P$ from the hold circuit 83 with $1/K_2$ as a reference value $V_R$. Thus, even when the peak value of the convolution output a varies, the proper reference value $V_R=V_P/K_2$ is determined in correspondence with the peak value. The reference value $V_R$ is inputted to the other terminal of the comparator 86. $K_2$ is set to be, e.g., 4/3. The comparison reference value setting circuit 85 also generates strength-discrimination signals PWL and PL representing the reference value $V_R$ corresponding to the strength of the received signal. As these strength-discrimination signals PWL, and PL, the most significant bit (MSB) or an OR output of the MSB and the next bit of the the reference value $V_R$ outputted from the circuit 85 is used. The signal PWL, is inputted to a selection circuit 88 (to be described later), and the signal PL is inputted to the OR gate 75 described above.

When the reference value $V_R$ which is a threshold value used for detecting the convolution output ($V_N$) is equal to or larger than a predetermined value, the H-level signal PWL is generated and causes the selection circuit 88 to select a predetermined stage of the shift register 87 but when the threshold value $V_R$ is smaller than the predetermined value, the signal PWL is L-level thereby causing the selection circuit 88 to select all the stages of the shift register 87 and outputs an OR of the stages.

Figure 7:
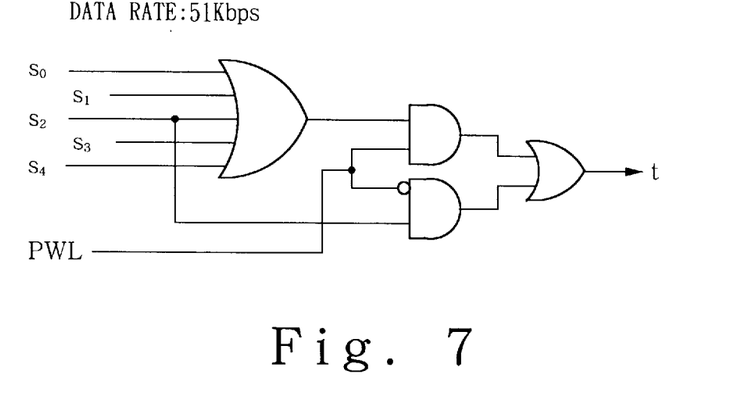
FIGS. 7 to 10 are detailed circuit diagrams of a signal selection circuit shown in FIG. 2.
Figure 8:
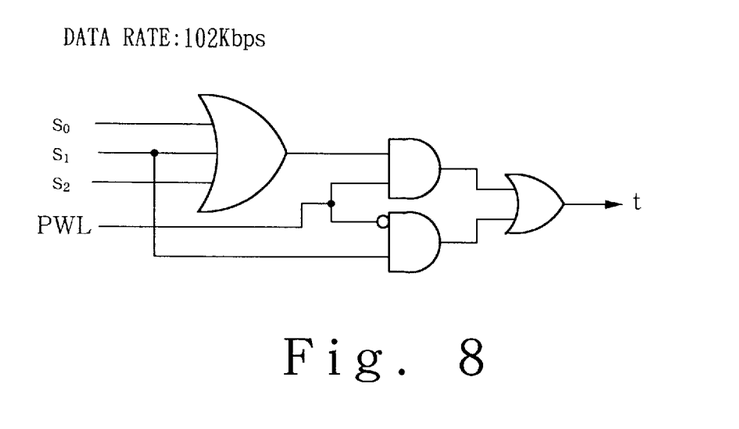
Figure 9:
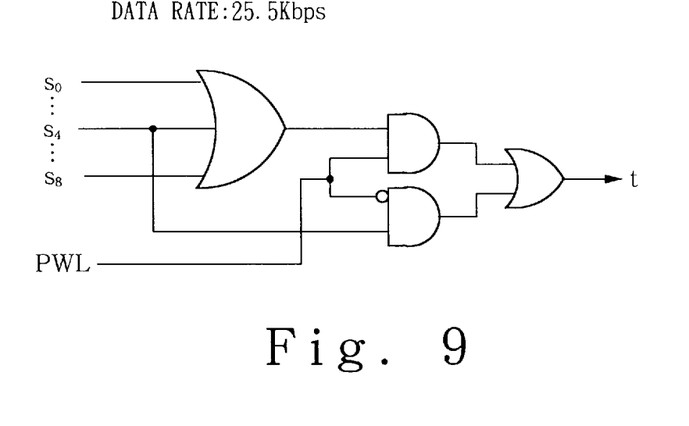
Figure 10:
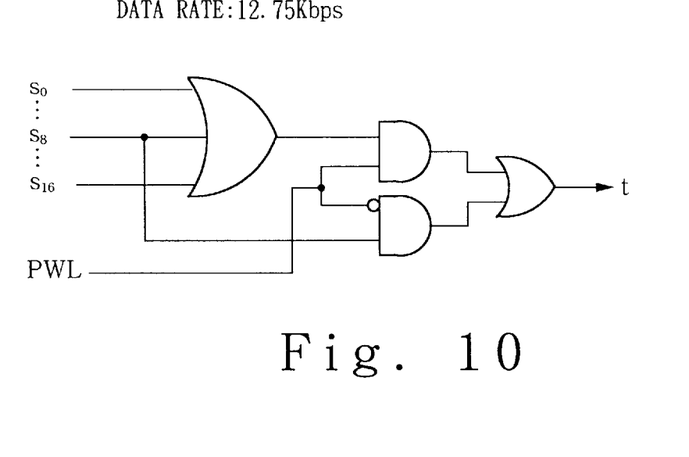

The comparator 86 compares the latch data $V_N$ of the latch circuit 79 with the reference value $V_R$ of the comparison reference value setting circuit 85, and sets its output at H-level while the latch data $V_N$ exceeds the reference value $V_R$. The shift register 87 is a register having 1 bit/(2N+1) stages. The shift register 87 fetches an output s ($=s_0$) from the comparator 86 in response to the leading edges of the clocks MSB and sequentially shifts the fetched output. In FIG. 5, $s_0$ to $s_4$ represent the outputs from the respective stages of the shift register 87 when N=2. The output from each stage is delayed by one period T/2 of the clocks MSB in each stage. The signal selection circuit 88 receives the outputs $s_0$ to $s_{2N}$ from the respective stages of the shift register 87, and also receives the strength-discrimination signal PWL from the comparison reference value setting circuit 85. When the signal PWL is at H-level (upon reception of a strong signal), the selection circuit 88 directly outputs the output $s_N$ from the (N+1)-th stage to the latch circuit 89. On the other hand, when the signal PWL is at L-level (upon reception of a weak signal), the selection circuit 88 outputs an disjunction (OR) t of the outputs $s_0$ to $s_{2N}$ from all the stages to the latch circuit 89. FIG. 7 shows the detailed arrangement of the signal selection circuit 88 when the data rate is 51 Kbps (N=2). FIGS. 8 to 10 respectively show the detailed arrangements of the signal selection circuit 88 when the data rate is 102 Kbps (N=1), 25.5 Kbps (N=4), and 12.75 Kbps (N=8).

The latch circuit 89 latches the output t from the signal selection circuit 88 in response to the leading edges of the clocks q which are outputted from the counter 76, have a period NT, and have a leading edge delayed by about T/4 from the peak position of the convolution output a. The latch output r serves as a primary modulated output (reproduction data output) of the receiver shown in FIGS. 1 and 2. As shown in FIG. 5, the waveform (output r) of the latch output r remains the same even when the OR t of the outputs $s_0$ to $s_4$ is latched by the clocks q upon reception of a weak signal (PWL=L-level) or when the output t' ($=s_2$) is latched by the clocks q upon reception of a strong signal (PWL=L-level). In the case of the data rate =51 Kbps (N=2), when a weak signal is received such that the heights of the two, i.e., first and last pulses can be clearly discriminated from those of the middle pulses in the convolution output a upon reception of H-level data, as indicated by the waveform a in FIG. 5, if the convolution output a is latched by the clocks MSB having a period T/2, L-levels are continuously latched five times upon reception of one L-level bit of the transmission data (see the output $s_0$). When the transmission data consists of two continuous L-level bits, L-levels continuously appear nine times in the latch output $s_0$; when the transmission data consists of three continuous I,-level bits, L-levels continuously appear 13 times in the latch output $s_0$. Therefore, even when the transmission data consists of one L-level bit, L-levels continuously appear only five times in the latch output $s_0$. For this reason, even when the latch output $s_0$ is shifted up to four times and an OR of all the stages is calculated, H-level does not perfectly overlap L-level data. Therefore, by latching the OR output t in response to the leading edges of the clocks q, the transmission data can be perfectly demodulated. Similarly, when the data rate is 102 Kbps (N=1), 25.5 Kbps (N=4), and 12.75 Kbps (N=8), the maximum numbers of times of shift: are respectively 2, 8, and 16. More specifically, in general, the maximum number of times of shift can be set to be 2N.

As described above, according to the present invention, in the spread spectrum communication receiver, since the period of the image PN code is synchronized with the convolution output, the peak position or peak value can be prevented from varying over time, and any reception error caused by such a variation can be prevented. When the convolution output is latched at the period T/2, the latch data is shifted to NT at the period T/2, appropriate ones of the shifted signals from the respective stages are synthesized, and the synthesized signal is latched at a timing delayed by a time τ satisfying 0<τ<T/2 from the shift timing, the transmission signal can be accurately demodulated even when some peaks of the convolution output are omitted, thereby preventing reception errors.

What is claimed is:

1. A spread spectrum communication receiver comprising:

an inverse spread demodulation circuit having an SS reference signal generation circuit for generating a spread spectrum reference signal having an image relationship with a spread spectrum signal to be received and demodulated, and a surface acoustic wave device for taking a correlation between a received spread spectrum signal and the spread spectrum reference signal; and a primary demodulation circuit having a detection circuit for generating a convolution output by detecting the correlation output from said inverse spread demodulation circuit, and a waveform shaping circuit for reproducing digital data of a transmission source by shaping the convolution output, wherein a pulse width of one bit of the digital data of the transmission source is substantially NT (where T is the repetition period of a PN code of the transmission source and N is an integer not less than 1), and said waveform shaping circuit comprises a convolution output detection circuit for converting a convolution output into a pulse having a width T/2 every time said detection circuit outputs a convolution output exceeding a predetermined level, a shift register for fetching an output from said convolution output detection circuit and shifting the fetched output at a predetermined timing every T/2, a selection circuit for selecting one or a plurality of stages of said shift register, and generating an OR output of outputs from the selected stages, and a latch circuit for latching the output from said selection circuit at the period NT and at a timing delayed by a time $\tau$ satisfying $0<\tau<T/2$ from the shift timing.

2. A receiver according to claim 1 wherein said shift register (87) has 2N stages, said convolution output detection circuit (77-86) changes a threshold value ($V_R$) used for detecting the convolution output in correspondence with a level of the convolution output, and said selection circuit (88) selects a predetermined stage of said shift register (87) and outputs the output from the selected stage when the threshold value ($V_R$) is equal to or larger than a predetermined value, and selects all the stages of said shift register (87) and outputs an OR of the stages when the threshold value ($V_R$) is smaller than the predetermined value.

\* \* \* \* \*